United States Patent
Eastlake, III

(10) Patent No.: US 9,628,439 B2
(45) Date of Patent: Apr. 18, 2017

(54) SYSTEMS AND METHODS FOR MANAGING NETWORK ADDRESS INFORMATION

(76) Inventor: Donald E. Eastlake, III, Milford, MA (US)

( * ) Notice: Subject to any disclaimer, the term of this patent is extended or adjusted under 35 U.S.C. 154(b) by 198 days.

(21) Appl. No.: 13/816,532

(22) PCT Filed: Aug. 12, 2011

(86) PCT No.: PCT/US2011/047621
§ 371 (c)(1),
(2), (4) Date: Feb. 12, 2013

(87) PCT Pub. No.: WO2012/021827
PCT Pub. Date: Feb. 16, 2012

(65) Prior Publication Data
US 2013/0145045 A1    Jun. 6, 2013

Related U.S. Application Data

(60) Provisional application No. 61/401,365, filed on Aug. 12, 2010.

(51) Int. Cl.
*G06F 15/16*    (2006.01)
*H04L 29/12*    (2006.01)

(52) U.S. Cl.
CPC ........ *H04L 61/25* (2013.01); *H04L 29/12028* (2013.01); *H04L 61/103* (2013.01); *H04L 61/2015* (2013.01)

(58) Field of Classification Search
CPC ... H04L 12/56; H04L 29/12839; H04L 61/10; H04L 61/6022; G06F 11/00; G06F 15/16
See application file for complete search history.

(56) References Cited

U.S. PATENT DOCUMENTS

| | | | | |
|---|---|---|---|---|
| 6,172,981 B1* | 1/2001 | Cox et al. | ...................... | 370/401 |
| 7,154,891 B1* | 12/2006 | Callon | .......................... | 370/392 |
| 7,155,632 B2* | 12/2006 | Vasavada | ....................... | 714/4.1 |
| 7,586,895 B2* | 9/2009 | Borgione | ....................... | 370/349 |
| 7,599,367 B2 | 10/2009 | Radhakrishnan et al. | | |
| 2002/0114326 A1 | 8/2002 | Mahalingaiah | | |
| 2005/0210150 A1* | 9/2005 | Bahl | ............................ | 709/245 |
| 2010/0098073 A1* | 4/2010 | Tanaka | ................ | H04L 12/4625 370/389 |

OTHER PUBLICATIONS

Written Opinion of the International Searching Authority of Application No. PCT/US2011/047621 mailed on Dec. 14, 2011.

\* cited by examiner

*Primary Examiner* — Liangche A Wang
*Assistant Examiner* — Ayele Woldemariam
(74) *Attorney, Agent, or Firm* — Wolf, Greenfield & Sacks, P.C.

(57) ABSTRACT

Systems, methods and apparatus for managing network address information. In some embodiments, an appropriate address authority is queried to obtain information useful for address mapping. For example, the address authority may be selected by determining whether an address to be mapped is within one or more blocks of addresses for which the address authority is authoritative. In some further embodiments, address mapping information may be distributed from an address authority to a network device, so that the network device may perform address mapping using locally available information.

18 Claims, 5 Drawing Sheets

Table of Layer 3 to Layer 2 Authorities

| Layer 3 Address Block | | Layer 2 Address of Authoritative Server | Layer 3 Address of Authoritative Server |
|---|---|---|---|
| Start | Stop | | |
| 1.2.0.0 | 1.2.255.255 | 00-00-00-12-34-56 | 5.6.0.1 |
| 1111::0 | 1111::FFFF | 00-00-FF-12-34-56 | 2222::1 |
| 10000 | 19999 | 00-00-00-12-34-56 | |
| ... | | ... | ... |

FIG. 6

SYSTEMS AND METHODS FOR MANAGING NETWORK ADDRESS INFORMATION

RELATED APPLICATIONS

This application is a national stage filing under 35 U.S.C. §371 of International Application No. PCT/US2011/047621, titled "Systems and Methods for Managing Network Address Information," filed on Aug. 12, 2011, which claims the benefit of U.S. Provisional Application No. 61/401,365, titled "Computer Network Multi-Destination Frame and Switch State Reduction," filed on Aug. 12, 2010. Each of these applications is incorporated herein by reference in its entirety.

BACKGROUND

I. Computer Networks

In a computer network, a group of computers and/or other devices communicate with each other via one or more communication links. One example of a network includes a pair of end stations each having a network interface, where the interfaces are connected to each other via a point-to-point network link. Another example of a network is shown in FIG. 1 and includes multiple computers 105A-O each having one or more network interfaces. Each interface is connected to one or more other interfaces either directly or via one or more of switches 110A-D. For instance, as shown in FIG. 1, station 105A may be connected to station 105B via switch 110B, and station 105H may be connected to station 105I via a shared link to switch 110D. Yet another example of a network is the Internet, which is a network having many interconnected subnetworks.

Data to be transmitted, such as a file, is often divided into smaller units of data to be transmitted separately over one or more networks and re-assembled at a receiving computer. Each such unit of data is commonly called a "frame," although it should be appreciated that data can be divided into frames in any suitable way, for example, according to any suitable communication protocol.

Any suitable communication link may be used to communicate data frames between network interfaces. For example, a link may be wired (e.g., electrical or optical) or wireless (e.g., radio, microwave, or infrared). A link may also be virtual (i.e., simulated).

Many network communication protocols have been developed over the years. A common model is the layered networking model, where communication functions are grouped into logical layers. For example, in an Open Systems Interconnection (OSI) model, there are seven layers arranged from top to bottom, each layer providing services to layers above and receiving services from layers below. For instance, Layer 2 (also known as the Data Link Layer) receives data transmission and reception services from Layer 1 (also known as the Physical Layer), and provides physical addressing services to Layer 3 (also known as the Network Layer).

Concepts of communications protocols layers, such as Layer 3 and Layer 2 of an OSI model, are explained in ITU-T (International Telecommunications Union—Telecommunications Standardization Sector) Recommendation X.200, "Information Technology—Open Systems Interconnection—Basic Reference Model: The Basic Model," which is incorporated herein by reference.

II. Switch Devices

A switch device in a network receives and transmits frames of data through network interfaces. Examples of switch devices include, but are not limited to, the following:

Bridges: For example, a bridge device may be generally conformant to any of IEEE (Institute of Electrical and Electronics Engineers) 802.1 bridging standards, including, but not limited to, IEEE 802.1D-2004, "IEEE Standard for Local and Metropolitan Area Networks/Media Access Control (MAC) Bridges," and IEEE 802.1Q-2011, "Standard for Local and Metropolitan Area Networks/Virtual Bridged Local Area Networks," which are incorporated herein by reference. It should be appreciated that a device conformant to a future IEEE 802.1 bridging standard, or a bridging standard developed by some other standard setting organization, may also be considered a "bridge," as aspects of the present disclosure are not limited to conformance to any particular bridging standard, nor to conformance to any standard at all. For example, a bridge device may be a device conformant to a specification for Shortest Path Bridges, which is being developed as an extension of IEEE 802.1, and uses a link state protocol to configure bridging mechanisms.

RBridges: For example, an RBridge device may be generally conformant to IETF (Internet Engineering Task Force) TRILL (TRansparent Interconnection of Lots of Links) standard as set out in IETF RFCs 6325, 6326, and 6327, which are incorporated herein by reference. Again, it should be appreciated that aspects of the present disclosure are not limited to conformance to any particular standard or version of a standard for an RBridge device, nor to conformance to any standard at all.

Routers: For example, a router device may forward or deliver data frames based on Layer 3 addresses specified in the frames. Because local networks use Layer 2 addresses to deliver a frame to a next router or final destination, a router may, on a per-router-hop basis, map Layer 3 addresses to Layer 2 addresses. In some instances, the router may change an outer Layer 2 address of the data frame to transport the frame to the next router or final destination.

Any other network devices adapted to route, forward, and/or deliver frames of data to one or more target interfaces (i.e., network interfaces to which the frames are addressed), or at least attempt to route, forward, and/or deliver the frames closer to the target interfaces.

Any combination of the above. This includes, for example, a BRouter, which is a device adapted to route frames whose Layer 3 addressing protocols are understood by the BRouter, and to bridge all other frames.

III. Local Area Networks

In a local area network (also referred to as a LAN or local network), frames may be delivered after transiting the network with source and destination Layer 2 addresses, or interface source and destination addresses, associated with the frames unchanged or changed only to a form easily convertible to the original Layer 2 addresses. Examples of such local networks include, but are not limited to, bridged LANs and RBridged campuses.

It should be appreciated that local networks need not be "local" in a geographical sense. A local network may include components located in a geographical area of any suitable size (e.g., including multiple cities, states, and/or countries), and may even include components in outer space.

IV. Types of Data Frames

Data frames traversing a network may be classified as being either "multi-destination" or "individually addressed." A "multi-destination" frame is a frame addressed to multiple destinations (e.g., multiple network interfaces). By contrast, an "individually addressed" frame is a data frame addressed to a single destination (e.g., a single network interface), and is sometimes called a "unicast" frame.

There are different types of multi-destination frames. For example, a "broadcast" frame is a multi-destination frame intended to be delivered to all interfaces in a local network. As another example, a "multicast" frame is a multi-destination frame intended to be delivered to a subset of such interfaces.

In some instances, a multi-destination frame may, despite being addressed to multiple interfaces, be delivered to only one interface or none at all. For example, this may happen when one or more interfaces to which the multi-destination frame is addressed do not exist in the local network.

V. Virtualization

A local network may include one or more virtual components. In such a network, data frames may be encapsulated so as to have at least one inner encapsulated address corresponding to a virtual component and at least one outer encapsulation address corresponding to a physical component on which the virtual component is running. Multiple layers of encapsulation may also be possible. Furthermore, links between network interfaces may traverse physical or simulated switches in such a way that, while some outer encapsulation addresses may be changed (e.g., per router hop), some inner encapsulated addresses may remain unchanged or only changed in an easily reversible fashion.

Similarly, one or more switches, each having one or more interfaces connected to a local network, may be virtual. In one example, one or more switches may be virtual computers running inside a physical computer or across multiple physical computers or inside or across multiple higher-level virtual computers. In another example, an entire local network may be virtually emulated inside a single physical computer, or between or among modules of one or more computers, physically aggregated on the same computer chip or chip(s), or the same board, or backplane, or boards, or backplanes, or within the same rack or cabinet, or within a computer center, or otherwise grouped.

Virtual stations inside a physical computer may interface with a switch in various ways. In one example, there may be a virtual switch (e.g., implemented by software) also inside the physical computer on which the virtual stations are running. The virtual stations may be connected to the virtual switch, which, in turn, may connect to a physical switch using a physical connection from the physical computer to the physical switch. In another example, there may be a protocol by which a virtual station's traffic is multiplexed over a physical connection to a physical switch, so that the virtual station may appear to be connected to the physical switch via virtual interfaces inside the physical switch. Other techniques, or combinations of these and other techniques, may also be used.

VI. Virtual LANs

A local network may be subdivided into multiple overlaid logical networks called Virtual LANs or VLANs. A local network divided into VLANs may have the same physical structure as if not so divided. However, each data frame may, in some fashion, be labeled or categorized to indicate a VLAN to which the data frame belongs. Furthermore, a network interface may, in some fashion, be restricted or categorized in some suitable manner, so that switches may only send frames of certain labeling or categorization through interfaces with corresponding categorization. For example, certain network interfaces may be associated a particular type of traffic associated with a subset of VLANs, such as input traffic or output traffic, so that only that type of traffic associated with that subset of VLANs is sent through the interfaces.

In a local network supporting such VLANs, there may be end stations or switches that are unaware of VLANs and that receive and transmit unlabeled frames on one or more network interfaces of the end stations or switches. Such an unlabeled frame may be classified by an interface of the first VLAN-aware switch at which the frame arrives, to indicate a VLAN to which the frame belongs. The classification may be based on one or more values of one or more fields within the frame. Moreover, there may be VLAN-aware end stations that receive and transmit VLAN-labeled frames on one or more network interfaces, and/or classify unlabeled frames received on one or more interfaces as being in one or more specific VLANs.

A VLAN may include nested sub-VLANs and, likewise, may be enclosed by other higher-level VLANs. Thus, a "network" in the present disclosure may refer to any physical or virtual network, which may or may not include one or more subnetworks, and may or may not be included in one or more other networks as a subnetwork.

SUMMARY

Systems, methods and apparatus are provided for managing network address information.

In some embodiments, a method is provided for use by at least one network device. The method comprises acts of: identifying a first address in a first set of addresses to be mapped to a second address in a second set of addresses different from the first set of addresses; using the first address to identify a corresponding address authority; and sending, to the identified address authority, a query to map the first address to a second address in the second set of addresses.

In some further embodiments, a method provided for use by at least one network device for managing address mapping information. The method comprises acts of: receiving address mapping information that maps addresses in a first set of addresses to addresses in a second set of addresses different from the first set of addresses; and storing the address mapping information.

In some further embodiments, an apparatus is provided, comprising at least one processor programmed to: identify a first address in a first set of addresses to be mapped to a second address in a second set of addresses different from the first set of addresses; use the first address to identify a corresponding address authority; and send, to the identified address authority, a query to map the first address to a second address in the second set of addresses.

In some further embodiments, an apparatus is provided, comprising at least one processor programmed to: receive address mapping information that maps addresses in a first set of addresses to addresses in a second set of addresses different from the first set of addresses; and store the address mapping information.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The accompanying drawings are not necessarily drawn to scale. For purposes of clarity, not every component may be labeled in every drawing.

FIG. 6 shows an illustrative table of authorities that can perform Layer 3 to Layer 2 address mapping, in accordance with some embodiments.

DETAILED DESCRIPTION

Figure 1:
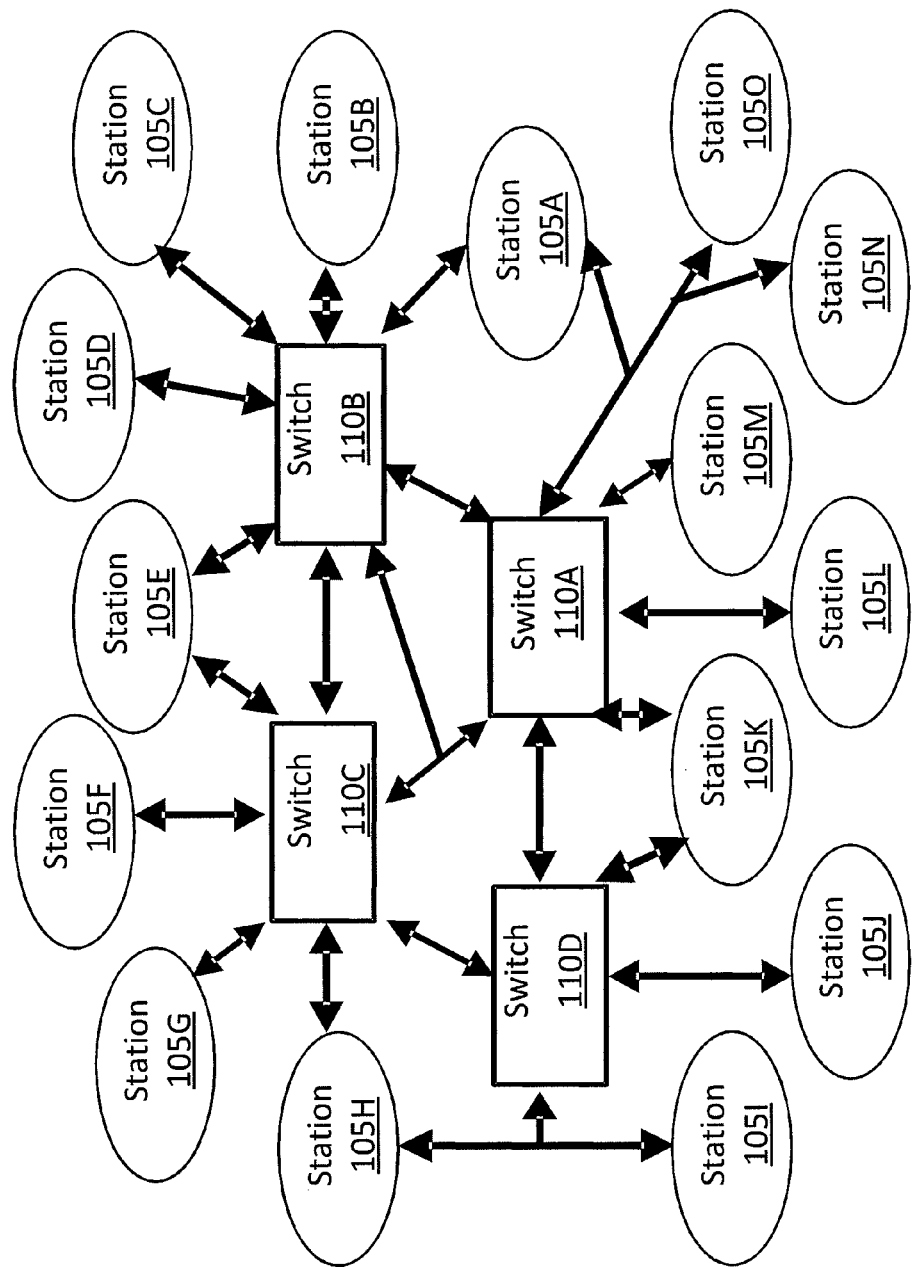
FIG. 1 shows an example of an illustrative network having connected thereto multiple computers.

The inventor has recognized and appreciated that multi-destination traffic may impose a significant burden on a network.

For example, broadcast frames may represent a particularly heavy burden on a local network and/or computers connected thereto. The local network may try to deliver every broadcast frame to all network interfaces in the local network. Furthermore, every computer in the local network may be interrupted by the receipt of a broadcast frame, and may need to perform some processing to determine whether the broadcast frame contains any relevant data or can be simply discarded.

Multicast frames may also represent a significant burden on a local network and/or computers connected thereto. Depending on the multicast technology in use, the network may try to deliver a multicast frame to either all network interfaces in the local network, or a subset of the interfaces as indicated within the frame or the frame's destination address. In some instances, a network interface may have hardware or other low level mechanisms to avoid interrupting any substantial part of a computer having that interface if a received multicast frame is not addressed to a group of interest to the computer. However, such multicast frame screening is commonly not effective or sufficiently fine-grained to avoid interrupting all or a substantial part of a computer to process multicast frames uninteresting to that computer.

The inventor has further recognized and appreciated that the amount of multi-destination traffic may grow as the size of a local network grows. For instance, the inventor has recognized and appreciated that, as a local network gets larger, multi-destination traffic may represent a larger fraction of the traffic on a typical link, which may limit capacity for individually addressed traffic and, in turn, may reduce network efficiency.

For example, each station (or virtual station as discussed in greater detail below) in use and attached to a local network may produce multi-destination frames at a consistent average rate depending on a type of the station. Thus, as the number N of stations grows, the amount of multi-destination traffic on each link may grow in a manner roughly proportional to N. Furthermore, since multi-destination frames, by definition, are addressed to at least some fraction of interfaces in the local network (all interfaces in the case of broadcast frames), the number of multi-destination frames arriving at each interface across the local network may also grow with N. Thus, the burden on the links and switches in a LAN caused by the handling of multi-destination traffic may increase with the size of the LAN, and may, as the LAN grows, crowd out other traffic.

The inventor has further recognized and appreciated that various advantages of local area networks have led to growth in the sizes of local networks, which may be in terms of the number N of stations and, in some cases, the number of switches and links. One example of such advantages is the so-called "plug-and-play" characteristic, namely, a station (e.g., a mobile station) may disconnect from a local network, move, and re-connect to the same local network. As long as the station retain the same physical address (e.g., a MAC address as explained below), the station's connection to the local network may continue to work. As another example, some local networks are "transparent" in that each delivered frame may be the same as, or not significantly different from, a corresponding transmitted frame. For instance, for communication between a VLAN-aware station and a VLAN-unaware station, data frames may be sent simply with VLAN tags added or removed as appropriate. These and other advantages have led to large local networks which, as noted above, may by burdened by multi-destination traffic.

The inventor has further recognized and appreciated that virtualization (e.g., running multiple virtual computers inside a physical computer or higher-level virtual computer) may exacerbate burdens associated with handling of multi-destination traffic. For instance, each virtual station may act for most purposes like a physical station and, in particular, may generate an equivalent number of multi-destination frames as a physical station. Thus, if a computer has running thereon M virtual stations, the resulting virtualized computer may generate M+1 times as many multi-destination frames, M times from the M virtual stations and once from the station on which the virtual stations are running. With more powerful modern physical computers, values of M of a few hundred or more are foreseeable. Thus, virtualizing a local network with N physical computers may result in an explosion of multi-destination frame traffic that is roughly proportional to N*M.

Thus, the inventor has recognized and appreciated that it may be beneficial to reduce multi-destination traffic, especially in large and/or virtualized local networks.

One approach to reduce multi-destination traffic may be to subdivide a local network into multiple VLANs, as discussed above. For example, the inventor has recognized and appreciated that, if a station interface is in one VLAN, then only multi-destination frames in that VLAN should be sent to that interface. Thus, by subdividing a local network into many VLANs, the network's traffic may be partitioned among the VLANs, thereby reducing traffic processing loads on network interfaces. However, this approach by itself may not substantially reduce loads on links between switches.

Furthermore, with virtualization, a physical computer may have hundreds of virtual stations running thereon. These virtual stations may be in different VLANs, in which case the multi-destination load on an interface of the physical computer may include multi-destination frames for all of the different VLANs. As a result, subdividing the local network into multiple VLANs, by itself, also may not substantially reduce the load on such a physical computer.

Another approach to reduce multi-destination traffic may be to convert multi-destination traffic to individually addressed traffic, which may represent a significantly lower burden on a local network and/or computers connected thereto. The inventor has recognized and appreciated that individually addressed frames may traverse a number of links which grows considerably more slowly than the size of a local network. The exact rate of growth may depend on the topology of the local network, but may be proportional to the logarithm of the number N of stations in the local network. For certain size ranges, equipment, and topologies, individually addressed frames may traverse at most a constant number of links.

The inventor has further recognized and appreciated that messages related to address allocation and mapping may be responsible for a significant amount of multi-destination traffic. Therefore, reducing multi-destination addressing messages may be an effective way to reduce the overall amount of multi-destination traffic.

For example, the inventor has recognized and appreciated that, in many communication protocols, address mapping (e.g., mapping addresses in one address space to addresses in another address space) may be performed via multi-destination messages. Therefore, reducing or eliminating this type of multi-destination massages may substantially reduce the overall amount of multi-destination traffic.

Accordingly, in some embodiments, systems and methods are provided for reducing multi-destination messages related to address mapping by replacing such messages with individually addressed messages. In one example, the address mapping is between different addresses associated with a same network interface. The different addresses may, although need not, be logical and physical addresses for the same network interface. For instance, as discussed in greater detail below, an OSI Layer 3 address for a network interface may be mapped to an OSI Layer 2 address, or vice versa.

The inventor has recognized and appreciated that reducing multi-destination messages related to mapping Layer 3 addresses to Layer 2 addresses may be an effective way to reduce burdens on a local network and/or computers connected thereto. However, it should be appreciated that aspects of the present disclosure are not limited to reducing this particular type of multi-destination messages. Rather, various concepts and techniques disclosed herein may be applied to reduce other types of multi-destination messages such as those related to lookup of locations of services in a LAN, address allocation, and configuration distribution. Examples of address allocation protocols include, but are not limited to, Dynamic Host Configuration (DHCP) related protocols such as IETF Bootstrap Protocol (BOOTP) and IETF DHCPv6. Examples of configuration distribution protocols include protocols used by virtual server management systems to manage virtual servers in a local network.

Following below are more detailed descriptions of various concepts related to, and embodiments of, inventive systems, methods and apparatus for reducing multi-destination traffic. It should be appreciated that various concepts introduced above and discussed in greater detail below may be implemented in any of numerous ways, as the disclosed concepts are not limited to any particular manner of implementation. For instance, the present disclosure is not limited to the particular arrangements of components shown in the various figures, as other arrangements may also be suitable. Such examples of specific implementations and applications are provided solely for illustrative purposes.

As mentioned above, conventional communication protocols often make use of multi-destination messages for addressing purposes.

In one illustrative scenario, when a sender sends a message to an intended recipient (or "target"), the sender labels the message with a logical address associated with the target, which may be an OSI Layer 3 address such as an Internet Protocol version 4 (IPv4) or Internet Version 6 (IPv6) address. When the message arrives at an entry point to a local network to which the target belongs (e.g., a router for the local network), or if the message is generated within the local network to which the target belongs, a physical address associated with the target is determined so the message can be delivered to the target using the physical address. This may be done because local networks use physical addresses to deliver messages to network interfaces.

A physical address used for delivery in a local network may be an OSI Layer 2 address, which may be a MAC (Media Access Control) address built into a network interface. A common form of MAC address is a 48-bit "Ethernet" Address, as specified in IEEE Standard 802-2001 ("IEEE Standard for Local and Metropolitan Area Networks: Overview and Architecture"), which is incorporated herein by reference. It may be desirable that MAC addresses be unique within a local network (i.e., each network interface in the local network has a different MAC address), because MAC addresses are used to address messages from one interface to another, so that confusion may result if MAC addresses are duplicated.

As mentioned above, some frames of data are intended for multiple recipients. A special form of MAC address that indicates a "group" destination is commonly used for this purpose, for example, by setting a group bit (e.g., a specific bit of the 48 address bits specified by the IEEE 802-2001 standard) to "on." Other types of MAC address may also provide ways to indicate such group designation, such as 64-bit and other sizes of MAC addresses that have from time to time been specified by IEEE 802, and other types of MAC addresses specified by other organizations.

A data frame addressed to such a group MAC address may be delivered to a group of network interfaces as if the data frame was sent separately and addressed individually to each network interface in the group. Membership of such a group of network interfaces may change dynamically, so that the group may, under certain circumstances, include only one or even zero members.

Different methods can be used to map a logical address associated with a target to a Layer 2 address, depending on the particular networking technologies involved. These methods typically involve sending a multi-destination query message containing a destination logical address. If a station associated with that logical address (i.e., a target station) receives this message, the station can respond with a corresponding Layer 2 address, so that data frames labeled with the logical address can be delivered to the station efficiently using messages individually addressed to the corresponding Layer 2 address. This response from the target station may be sent using an individually addressed message directed to an interface from which the query was sent, or using a multi-destination frame.

Examples of protocols using this type of multi-destination address queries include ARP (Address Resolution Protocol) used in connection with IPv4 and initially specified in IETF RFC 826 ("An Ethernet Address Resolution Protocol"), which uses broadcast messages, and ND (Neighbor Discovery) used in connection with IPv6 and initially specified in IETF RFC 4861 ("Neighbor Discovery for IP version 6 (IPv6)"), which uses multicast messages. A similar example, in which multi-destination queries are used to map MAC addresses to corresponding Layer 3 addresses, is RARP (Reverse Address Resolution Protocol), as specified in IETF RFCs 903 and 1931. An example of an address query protocol is DHCPLEASEQUERY, as specified in IETF RFCs 4388 and 5007. All of these RFCs are incorporated herein by reference.

The inventor has recognized and appreciated that multi-destination address queries such as those discussed above may be inefficient because logical addresses specified in such queries often do not exist in a local network. For example, a specified logical address may not correspond to any physical network interface registered to connect to the local network, or may correspond to a physical network interface that is disconnected at the time of the query. A query that fails, in the sense that no response is received, may be repeated. In some instances, as much as 90% of multi-destination address queries concern logical addresses that do not exist in a local network. A station sending such a query may detect that the requested logical address does not exist in the local network when no responses are received within some threshold amount of time, for example, a time period long enough that any actual response to the query is expected to have been received.

Accordingly, in some embodiments, a network device (e.g., an end station or a switch) is adapted to obtain address information using individually addressed queries to one or more address authorities, rather than using multi-destination address queries. For example, a network device may map logical addresses to physical addresses, or vice versa, using individually addressed queries to one or more address authorities. As another example, a network device may use individually addressed queries to one or more address authorities to obtain information as to existence or non-existence of an address in a local network, where the address may be logical (e.g., a Layer 3 address) or physical (e.g., a MAC address).

In some alternative embodiments, address information may be distributed to network devices such as switches and stations by one or more address authorities, instead of, or in addition to, being provided to the network devices by the address authorities in response to specific queries. In this manner, a network device may maintain up-to-date address information and may be able to identify a needed address (e.g., a physical address corresponding to a specified logical address) using fewer multi-destination queries, or fewer queries overall, or no query at all.

An address authority may be any suitable network device (e.g., a station or switch) having address information, such as information mapping logical addresses to corresponding physical addresses, or vice versa, or information as to existence or non-existence of addresses. An example of a suitable address authority is an address allocation server (e.g., a DHCP server) from which a station in a network may dynamically obtain a logical address (e.g., an IPv4 or IPv6 address) using a suitable address allocation protocol. Such a server may receive requests for address allocation, which may contain physical address information regarding the requesters, such as a MAC address for a network interface that sent an address allocation request. As a result, an address allocation server may have sufficient information to map allocated logical addresses to corresponding physical addresses, and vice versa.

Examples of address allocation protocols include, but are not limited to, IETF DHCP for IPv4, initially specified in IETF RFC 2131 ("Dynamic Host Configuration Protocol"), and IETF DHCP for IPv6, initially specified in IETF RFC 3315 ("Dynamic Host Configuration Protocol for IPv6 (DHCPv6)"). Both of these RFCs are incorporated herein by reference. Another example of an address allocation protocol is a precursor of DHCP called IETF BOOTP (Bootstrap Protocol), as specified in IETF RFC 951 and RFC 1542, which are also incorporated herein by reference. These protocols may grant logical address allocations for a limited period of time, and may provide facilities for renewing, revoking, refusing, querying, or setting the status of such allocations.

Another example of a suitable address authority may be a virtual server management system, which manages various aspects of virtual servers in a local network, such as creation, relocation, and/or termination. Such a system may have information regarding logical and physical addresses of the virtual servers being managed, as well as locations of the virtual servers in the local network. For example, a virtual server management system may have address information (e.g., Layer 3 and Layer 2 addresses) regarding physical servers on which the virtual servers are running.

Again, it should be appreciated that aspects of the present disclosure are not limited to the use of any particular type of servers as address authorities. Any suitable network device, such as a station or switch, having some desired address information may act as an address authority for other network devices.

Furthermore, inventive concepts and techniques disclosed herein are not limited to being used for address mapping in connection with the ARP, ND, and RARP protocols discussed above. For instance, in a station testing scenario, a station may query one or more address authorities using one or more individually addressed messages, rather than using multi-destination messages, to determine whether a logical address (e.g., a Layer 3 address) that the station is about to start using is already in use within a local network. Similarly, a station may send one or more individually addressed messages to one or more address authorities, rather than multi-destination messages, to announce that the station has adopted a new address (e.g., a new MAC or Layer 3 address), or is connected to a local network via a new attachment point.

Figure 2:
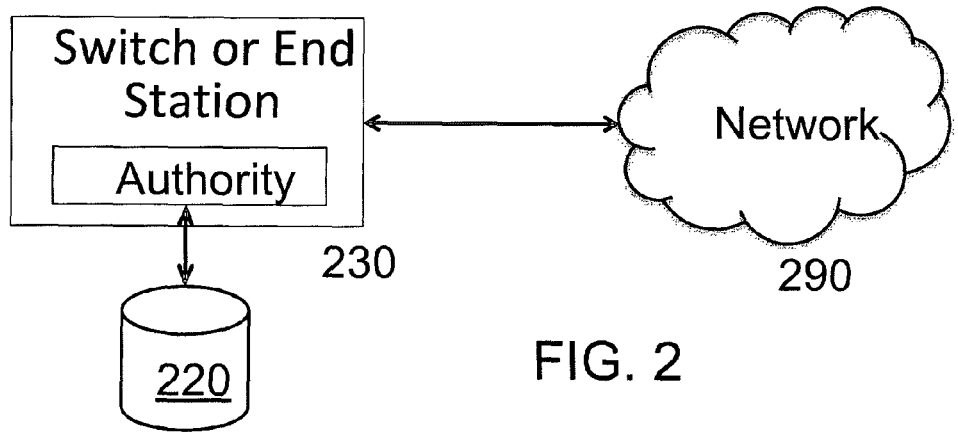
FIG. 2 shows an example in which address information is locally available to an illustrative network device, in accordance with some embodiments.
Figure 3:
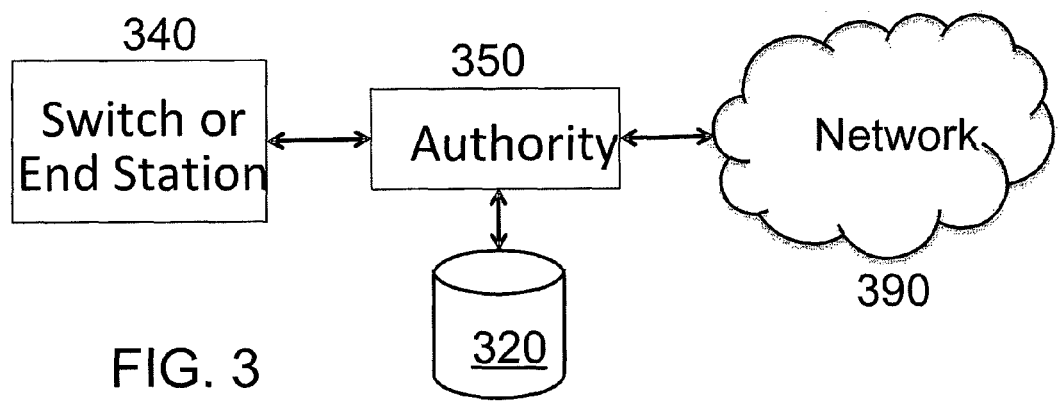
FIG. 3 shows an example in which an illustrative network device queries a nearby address authority for address information, in accordance with some embodiments.
Figure 4:
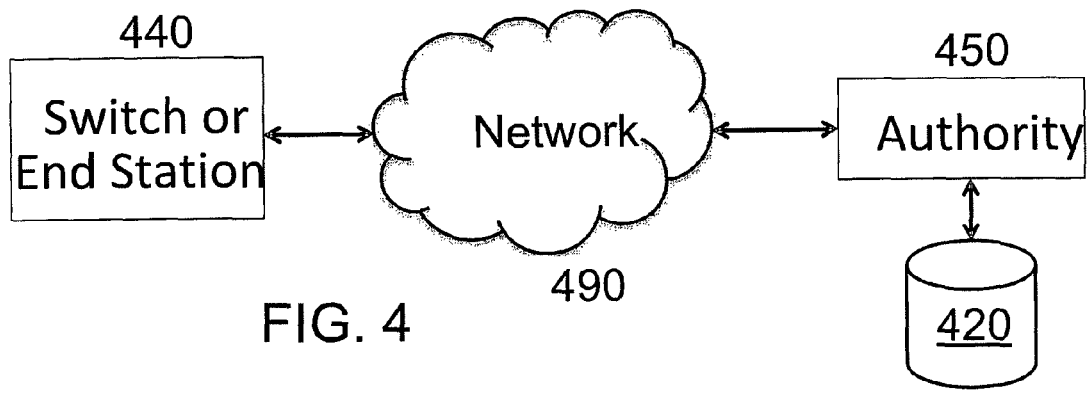
FIG. 4 shows an example in which an illustrative network device queries an address authority using individually addressed messages, in accordance with some embodiments.

FIGS. 2-4 illustrate various ways in which inventive concepts and techniques disclosed herein may be used to reduce multi-destination messages, in accordance with some embodiments of the present disclosure.

FIG. 2 shows an example in which address information is locally available to an illustrative network device 230, in accordance with some embodiments.

In this example, the network device 230 may be hosting an address authority. As a result, processes running on the network device 230 may obtain address information 220 from the address authority without causing any traffic in an associated local network 290.

The locally obtained address information may be of any suitable type and may be used by the network device 230 in any suitable way. For instance, in some embodiments, the network device 230 may receive a data frame labeled with a logical destination address and use the locally obtained address information to map the logical destination address to a physical address. The network device 230 may then deliver the data frame at the physical address. In this manner, no multi-destination messages may be involved in delivering the data frame.

In some alternative embodiments, the network device 230 may use the locally obtained address information to respond to an address query. The address query may be generated according to an address mapping protocol, such as ARP, ND, RARP, or the like. For example, the network device 230 may use the locally obtained address information to map a Layer 3 address contained in an address query to a corresponding MAC address, and may respond to the address query using the corresponding MAC address. If the process that generated the address query is also hosted by the network device 230, then responding to the address query may not involve any network traffic. Otherwise, the network device may use either an individually addressed message or a multi-destination message to respond to the address query.

In such an embodiment, multi-destination traffic may be reduced but not completely eliminated. For example, the address query may be sent to the network device 230 using a multi-destination message. Nonetheless, this approach may reduce multi-destination messages in a manner that is transparent to processes sending address queries. That is, from the perspective of a process that sends an address query, a response received from the network device 230 may be indistinguishable from a response received from a station associated with the requested address, as in a conventional address mapping protocol. In this manner, various inventive concepts and techniques may be practiced without requiring any modification to processes that send address queries. Furthermore, in some embodiments, an amount of reduction in multi-destination messages may be proportional to a percentage of queries that can be answered using locally available information.

It should be appreciated that the network device 230 may be switch, end station, or some other suitable type of device. The network device may also be physical or virtual, as aspects of the present disclosure are not limited to the use of either type of devices.

FIG. 3 shows an example in which an illustrative network device 340 queries a nearby address authority 350 for address information, in accordance with some embodiments.

The network device 340 may be similar to the network device 230 shown in FIG. 2 and may use address information in any of the various ways discussed above in connection with FIG. 2. However, in the example shown in FIG. 3, the network device 340 may not have locally available address information. Rather, the network device 340 may request address information 320 from a nearest or nearby address authority 350, which may be running on an end station, a switch, or some other suitable type of physical or virtual device.

In various embodiments, the network device 340 may use multi-destination or individually addressed messages to request address information from the address authority 350. Even if multi-destination messages are used, such messages may traverse only a small portion of a local network, without affect the rest of the network 390.

In some further embodiments, the address authority 350 may be a proxy for a "true" authority (not shown), and multi-destination messages for address queries may be changed by the proxy to individually addressed messages to the true authority.

FIG. 4 shows an example in which an illustrative network device 440 queries an address authority 450 for address information using individually addressed messages, in accordance with some embodiments.

The network device 440 may be similar to the network device 230 shown in FIG. 2 and may use address information in any of the various ways discussed above in connection with FIG. 2. However, in the example shown in FIG. 4, the network device 440 may not have locally available address information. Rather, the network device 340 may request address information 420 from an address authority 450, which may be running on an end station, a switch, or some other suitable type of physical or virtual device.

In the example shown in FIG. 4, the address authority may not be located near the network device 440. In such a scenario, substantial improvement may be achieved if the network device 340 queries only a small number of address authorities over a local network 490. For example, such queries or informative messages may be sent individually addressed to each address authority, so that multi-destination messages between the network device 340 and the address authorities may be avoided entirely. Even if some multi-destination messages are used, some improvement may still be achieved. For example, the network device 440 may use a multi-destination message to locate and obtain information about the authority 450, but may thereafter send individually addressed queries to the authority 450.

In the example shown in FIG. 4, the network device 440 may need to be aware of addresses of the address authorities, so that the network device 440 may send individually addressed queries to the address authorities. Such address information may be distributed to, or discovered by, the network device 440 in a variety of ways, for example, via queries or link state database synchronization.

In database synchronization, multiple network devices may maintain respective copies of a common database and may participate in a protocol to attempt to make the copies consistent with each other, for example, by detecting changes in remote copies (e.g., through the use of sequence numbers, checksums, or other indicia of such remote copies) and updating local copies to be consistent with remote copies. In the absence of continuing changes, the copies of the database may converge to the same content. Such a synchronization mechanism may be used, for example, in link state routing protocols to synchronize network topology and/or other information among different switches. In one embodiment, such link state database synchronization may be performed according to an Intermediate System to Intermediate System (IS-IS) protocol, as specified in ISO/IEC 10589:2002, Second Edition, "Intermediate System to Intermediate System Intra-Domain Routeing Exchange Protocol for use in Conjunction with the Protocol for Providing the Connectionless-mode Network Service (ISO 8473)," 2002, which is incorporated herein by reference.

As mentioned above, an address authority may be an address allocation server, such as a DHCP server, or a virtual server management system. The inventor has recognized and appreciated that it may be desirable for a network device that queries an address authority for address information to be aware of one or more blocks of addresses for which the address authority is authoritative. For example, a network device may decide whether to query an address authority by determining whether a requested address (which may be physical, virtual, or logical) is in a block of addresses for which the address authority is authoritative. Furthermore, if an address authority does not respond to an address query from a network device, and the network device is aware that the address specified in the address query is in a block of addresses for which the address authority is authoritative, the network device may determine that the address does not exist in an associated network, without having to query any other address authority.

Accordingly, in some embodiments, an address authority may allow a network device to query for some suitable specification (e.g., boundaries) of one or more blocks of addresses for which the address authority is authoritative. For example, one or more address allocation servers allocating from a particular set or block of Layer 3 addresses may be considered authoritative for whether addresses in that block exist in a local network. Similarly, an RARP server may be considered authoritative for those MAC addresses for which the RARP server has Layer 3 address mapping information. As yet another example, a network device may be considered authoritative for the MAC and/or Layer 3 addresses currently in use by the network device's own interfaces.

Figure 5:
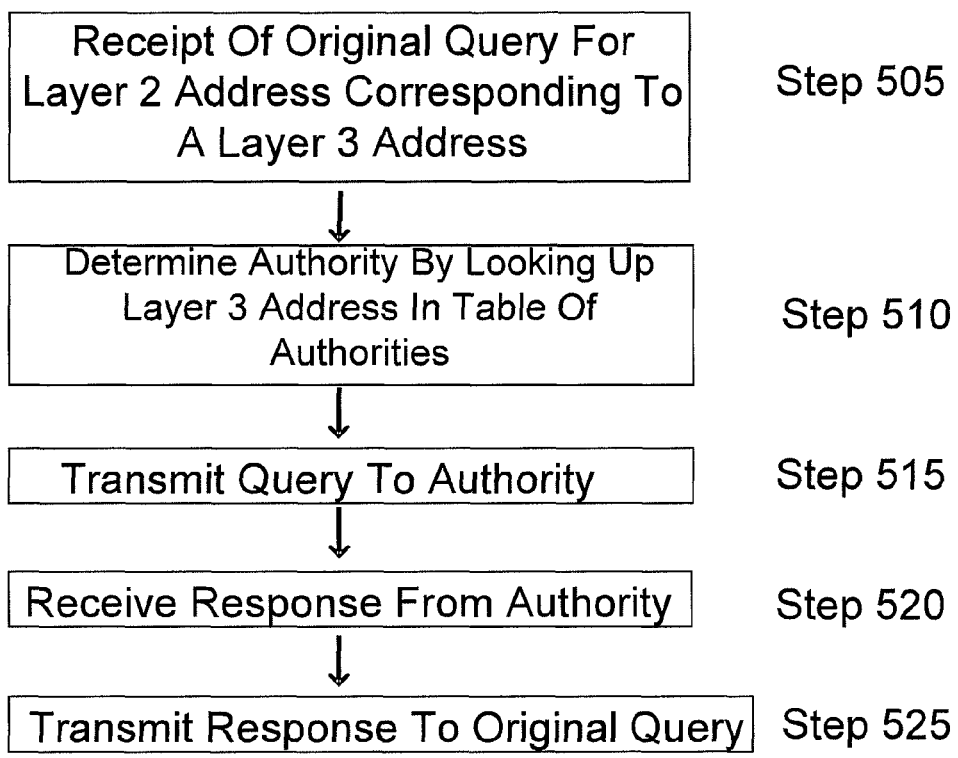
FIG. 5 shows an illustrative process that can be performed by a network device to improve address mapping protocols, in accordance with some embodiments.

FIG. 5 shows an illustrative process that can be performed by a network device, such as the network device 440 shown in FIG. 4, to improve address-mapping protocols such as ARP or ND, in accordance with some embodiments.

At step 505, the network device may receive a query requesting a Layer 2 address corresponding to a Layer 3 address. Such a query may be received as a multi-destination ARP or ND message. At step 505, the network device may use the Layer 3 address specified in the query to look up an appropriate authority from a table such as the illustrative table shown in FIG. 6, which is described in greater detail below.

At step 515, the network device may reformat the query received at step 505 and transmit the reformatted query to the authority identified at step 510 using an individually addressed message. At step 520, the network device may receive a response from the identified authority containing the requested Layer 2 address. At step 525, the network device may respond to the source of the query received at step 505 with the requested Layer 2 address received from the identified authority. This response may be sent via a multi-destination ARP or ND message.

Thus, in this example, multi-destination messages are used only at the first and last steps (i.e., steps 505 and 525), and individually addressed messages are used to query the authority at steps 515 and 520. As a result, a portion of an associated local network within which multi-destination messages are transported is reduced, thereby decreasing traffic and/or processing loads on the local network.

FIG. 6 shows an illustrative table of authorities that can perform Layer 3 to Layer 2 address mapping, in accordance with some embodiments. In this example, each row may correspond to an authority. The first two columns may indicate, respectively, a beginning and an end of a block of Layer 3 addresses for which the authority is knowledgeable. The third column may indicate a Layer 2 address of the authority, which may be used to communicate with the authority within an associated local network using individually addressed messages. The fourth column may indicate a Layer 3 address of the authority, which may also be used to communicate with the authority.

In the example of FIG. 6, the first row of data illustrates an IPv4 Layer 3 address block, and the second row illustrates an IPv6 address block, using typical notation. The third row illustrates a hypothetical Layer 3 address block according to some other communication protocol. There may be any number of rows in such a table, and a particular authority listed might be authoritative for one or many blocks of the same or different types of Layer 3 addresses.

As discussed above, authoritative address information may, in some alternative embodiments, be distributed to switches and/or stations, rather than being obtained by the switches and/or stations via specific queries. For example, in some embodiments, a database synchronization mechanism may be used to distribute address information. Examples of such a database synchronization mechanism include, but are not limited to, link state database synchronization mechanisms of link state routers, RBridges, or Shortest Path Bridges.

Figure 7:
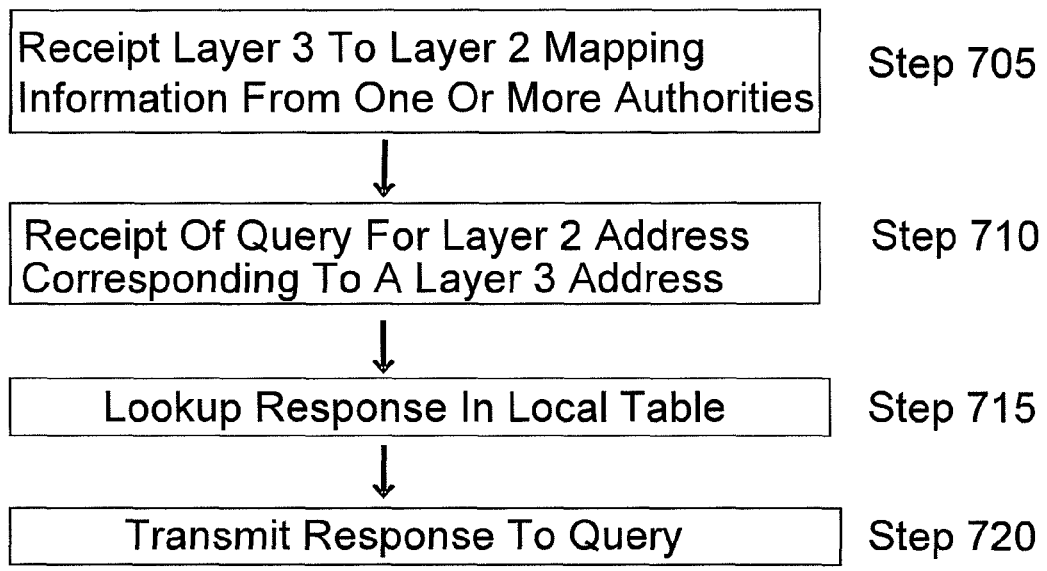
FIG. 7 shows an illustrative process that can be performed by a network device to improve address mapping protocols using distributed address information, in accordance with some embodiments.

FIG. 7 shows an illustrative process that can be performed by a network device, such as the network device 440 shown in FIG. 4, to improve address mapping protocols such as ARP or ND using distributed address information, in accordance with some embodiments.

At step 705, the network device may receive address information, such as Layer 3 to Layer 2 address mapping information, from one or more authorities. At step 710, the network device may receive a query requesting a Layer 2 address corresponding to a Layer 3 address. At step 715, a Layer 2 address corresponding to the Layer 3 addressed specified in the query received at step 710 may be looked up from the address information received at step 705. At step 720, the network device may respond to the source of the query received at step 710 with the Layer 2 address looked up at step 715 from the address information received at step 705.

As noted above, a network device may be able to access, either locally or using individually addressed messages, sufficient address information to enable the network device to respond to any address query of interest. For instance, if the network device has stored in one or more local tables, or can reliably access using individually addressed messages to one or more address authorities, information concerning all Layer 3 or MAC addresses of a particular type (e.g., all such addresses for a particular VLAN or collection of VLANs), the network device may be able to respond to all address mapping queries concerning such addresses without sending any multi-destination messages over an associated local network. (An exception may be queries that require a cryptographically authenticated response, which must be handled by a network device holding appropriate cryptographic keys.) Such complete knowledge may be referred to as "omniscience," and a network device with such complete knowledge may be said to be "omniscient" with regard to address mapping queries related to such addresses.

The inventor has recognized and appreciated that omniscience may be helpful in reducing multi-destination traffic, and that omniscience at a network device may be achieved, or at least approximated, by requiring that all existing Layer 3 or MAC addresses in a network be either provided through one or more address authorities to which the network device has access using individually addressed messages, or manually configured and distributed to such address authorities. In various embodiments, such requirements may be imposed on a LAN by LAN, or VLAN by VLAN, basis.

Accordingly, in some embodiments, by locating address authorities and/or manually configuring addresses at trusted elements of a local network (e.g., switches), and by distributing mapping information and/or locations of such trusted elements reliably, any station or switch in receipt of such mapping and/or location information, or capable of querying for such mapping and/or location information, may be capable of omniscient response (e.g., omniscient ARP/ND response). If mapping information is so distributed, or is at known locations in a network, so that the mapping information can be queried with individually addressed frames, no multi-destination frames may be required throughout the local network to obtain information needed for responses, thereby reducing the burden on the network.

The inventor has further recognized and appreciated that the presence of switches in a network with authoritative information as to which Layer 3 and/or MAC addresses should exist in that network, the pairings between Layer 3 and MAC addresses, and where stations with such Layer 3 and/or Layer 2 addresses should be connected to the local network may permit filtering on frames arriving at a switch to substantially reduce frames with forged Layer 3 and/or MAC addresses. For example, a frame may be determined to have forged Layer 3 and/or MAC addresses if any address information specified by the frame is inconsistent with address information stored on the switch or if the frame is arriving at an interface inconsistent with any known attachment point of any station that may have legitimately originated the frame.

Figure 8:
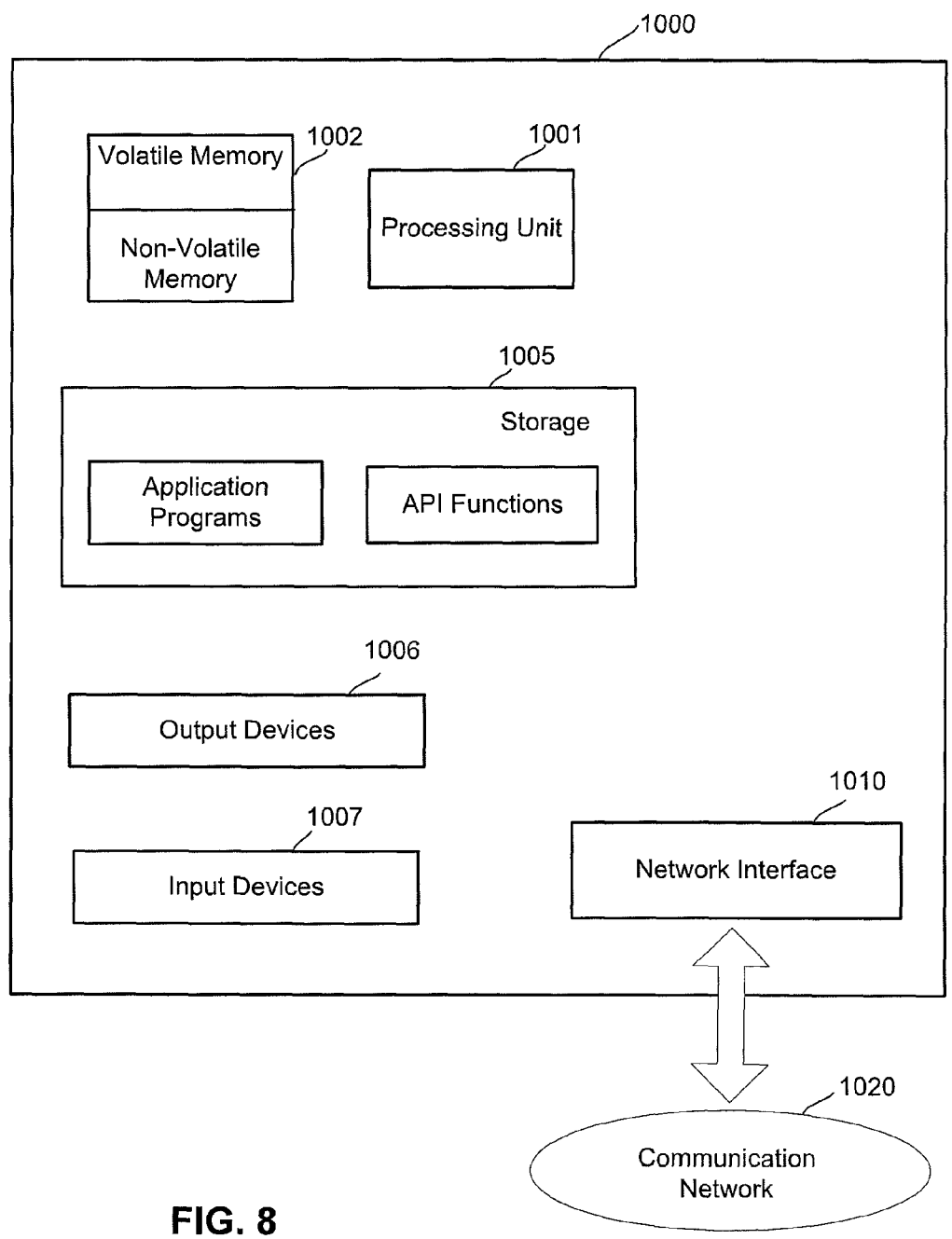
FIG. 8 shows, schematically, an illustrative computer on which various inventive aspects of the present disclosure may be implemented.

FIG. 8 shows, schematically, an illustrative computer 1000 on which various inventive aspects of the present disclosure may be implemented. The computer 1000 includes a processor or processing unit 1001 and a memory 1002 that may include volatile and/or non-volatile memory. The computer 1000 may also include storage 1005 (e.g., one or more disk drives) in addition to the system memory 1002. The memory 1002 may store one or more instructions to program the processing unit 1001 to perform any of the functions described herein. The memory 1002 may also store one more application programs and/or Application Programming Interface (API) functions.

The computer 1000 may have one or more input devices and/or output devices, such as devices 1006 and 1007 illustrated in FIG. 8. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

As shown in FIG. 8, the computer 1000 may also comprise one or more network interfaces (e.g., the network interface 1010) to enable communication via various networks (e.g., the network 1020). Examples of networks include a local area network or a wide area network, such as an enterprise network or the Internet. Such networks may be based on any suitable technology and may operate according to any suitable protocol and may include wireless networks, wired networks or fiber optic networks.

Finally, the computer 1000 may be a mobile device that is sufficiently small so as to be carried by a user (e.g., held in a hand of the user). Examples of mobile devices include, but are not limited to, mobile phones, pagers, portable media players, e-book readers, handheld game consoles, personal digital assistants (PDAs) and tablet computers. In some instances, the weight of a mobile device may be at most one pound, and/or the largest dimension of a mobile device may be at most six inches. Additionally, a mobile device may include features that enable the user to use the device at diverse locations. For example, a mobile device may include a power storage device (e.g., battery) so that it may be used for some duration without being plugged into a power outlet. As another example, a mobile device may include a wireless network interface configured to provide a network connection without being physically connected to a network connection point.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a non-transitory computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A method comprising acts of:
    storing, by at least one network switch, an address authority table, the address authority table mapping sets of Open Systems Interconnection (OSI) model Layer 3 addresses to address authorities, wherein:
    for each set of OSI model Layer 3 addresses mapped by the address authority table, the address authority table identifies an address authority that has trusted address mapping information for that set of OSI model Layer 3 address;
    identifying, by the at least one network switch, a first address in a first set of addresses, wherein the first address is to be mapped to a second address in a second set of addresses different from the first set of addresses, and wherein the first address is an OSI model Layer 3 address and the second set of addresses comprises a set of OSI model Layer 2 addresses;
    selecting, by the at least one network switch, an address authority from a plurality of address authorities to which the at least one network switch has access via individually addressed network messages, wherein selecting an address authority comprises looking up the address authority from the address authority table, and wherein:
    the first address belongs to a set of OSI model Layer 3 addresses mapped by the address authority table, the set of OSI model Layer 3 addresses comprises addresses within a virtual local area network; and
    the selected address authority is identified in the address authority table as having trusted address mapping information for the virtual local area network; and
    sending, by the at least one network switch, to the selected address authority, a query, via an individually addressed network message, to map the OSI model Layer 3 address to an OSI model Layer 2 address in the second set of addresses, wherein the set of OSI model Layer 3 addresses for which the selected address authority has trusted address mapping information comprises one or more address blocks for which the selected address authority has trusted address mapping information.

2. The method of claim 1, wherein the query sent to the selected address authority is a second query, and wherein the act of identifying the first address comprises:
    receiving a first query, via a first network message, to map the first address to a second address in the second set of addresses.

3. The method of claim 2, wherein the first network message is a multi-destination network message.

4. The method of claim 2, further comprising acts of:
    receiving, via a third network message, a response to the second query from the selected address authority, the response comprising a second address in the second set of addresses;
    sending, via a fourth network message, a response to the first query with the second address.

5. The method of claim 4, wherein the third network message is an individually addressed network message, and the fourth network message is a multi-destination network message.

6. The method of claim 1, further comprising an act of:
    determining that the first address does not correspond to any second address in the second set of addresses when no network message response to the query is received from the selected address authority within a selected threshold period of time.

7. An apparatus comprising a network switch, the network switch comprising at least one processor programmed to:
    store an address authority table, the address authority table mapping sets of Open Systems Interconnection (OSI) model Layer 3 addresses to address authorities, wherein:
    for each set of OSI model Layer 3 addresses mapped by the address authority table, the address authority table identifies an address authority that has trusted address mapping information for that set of OSI model Layer 3 address;
    identify a first address in a first set of addresses, wherein the first address is to be mapped to a second address in a second set of addresses different from the first set of addresses, and wherein the first address is an OSI model Layer 3 address and the second set of addresses comprises a set of OSI model Layer 2 addresses;
    select an address authority from a plurality of address authorities to which the at least one network switch has access via individually addressed network messages, wherein the at least one processor is programmed to select an address authority at least in part by looking up the address authority from the address authority table, and wherein:
    the first address belongs to a set of OSI model Layer 3 addresses mapped by the address authority table, the set of OSI model Layer 3 addresses comprises addresses within a virtual local area network; and the selected address authority is identified in the address authority table as having trusted address mapping information for the virtual local area network; and send, to the selected address authority, a query, via an individually addressed network message, to map the OSI model Layer 3 address to an OSI model Layer 2 address in the second set of addresses, wherein the set of OSI model Layer 3 addresses for which the selected address authority has trusted address mapping information comprises one or more address blocks for which the selected address authority has trusted address mapping information.

8. The apparatus of claim 7, wherein the query sent to the selected address authority is a second query, and wherein the at least one processor is programmed to:

identify the first address from a first query received by the at least one processor via a first network message, the first query requesting that the first address be mapped to a second address in the second set of addresses.

9. The apparatus of claim 8, wherein the first network message is a multi-destination network message.

10. The apparatus of claim 8, wherein the at least one processor is further programmed to:

receive, via a third network message, a response to the second query from the selected address authority, the response comprising a second address in the second set of addresses; and send, via a fourth network message, a response to the first query with the second address.

11. The apparatus of claim 10, wherein the third network message is an individually addressed network message, and the fourth network message is a multi-destination network message.

12. The apparatus of claim 7, wherein the at least one processor is further programmed to:

determine that the first address does not correspond to any second address in the second set of addresses when no network message response to the query is received from the selected address authority within a selected threshold period of time.

13. At least one non-transitory computer-readable medium having encoded thereon instructions which, when executed, cause at least one processor to perform a method comprising acts of:

storing, by at least one network switch, an address authority table, the address authority table mapping sets of Open Systems Interconnection (OSI) model Layer 3 addresses to address authorities, wherein:

for each set of OSI model Layer 3 addresses mapped by the address authority table, the address authority table identifies an address authority that has trusted address mapping information for that set of OSI model Layer 3 address;

identifying, by the at least one network switch, a first address in a first set of addresses, wherein the first address is to be mapped to a second address in a second set of addresses different from the first set of addresses, and wherein the first address is an OSI model Layer 3 address and the second set of addresses comprises a set of OSI model Layer 2 addresses;

selecting, by the at least one network switch, an address authority from a plurality of address authorities to which the at least one network switch has access via individually addressed network messages, wherein selecting an address authority comprises looking up the address authority from the address authority table, and wherein:

the first address belongs to a set of OSI model Layer 3 addresses mapped by the address authority table, the set of OSI model Layer 3 addresses comprises addresses within a virtual local area network; and the selected address authority is identified in the address authority table as having trusted address mapping information for the virtual local area network; and sending, by the at least one network switch, to the selected address authority, a query, via an individually addressed network message, to map the OSI model Layer 3 address to an OSI model Layer 2 address in the second set of addresses, wherein the set of OSI model Layer 3 addresses for which the selected address authority has trusted address mapping information comprises one or more address blocks for which the selected address authority has trusted address mapping information.

14. The at least one non-transitory computer-readable medium of claim 13, wherein the query sent to the selected address authority is a second query, and wherein the act of identifying the first address comprises:

receiving a first query, via a first network message, to map the first address to a second address in the second set of addresses.

15. The at least one non-transitory computer-readable medium of claim 14, wherein the first network message is a multi-destination network message.

16. The at least one non-transitory computer-readable medium of claim 14, wherein the method further comprises acts of:

receiving, via a third network message, a response to the second query from the selected address authority, the response comprising a second address in the second set of addresses; and sending, via a fourth network message, a response to the first query with the second address.

17. The at least one non-transitory computer-readable medium of claim 16, wherein the third network message is an individually addressed network message, and the fourth network message is a multi-destination network message.

18. The at least one non-transitory computer-readable medium of claim 13, wherein the method further comprises an act of:

determining that the first address does not correspond to any second address in the second set of addresses when no network message response to the query is received from the selected address authority within a selected threshold period of time.

* * * * *

UNITED STATES PATENT AND TRADEMARK OFFICE
CERTIFICATE OF CORRECTION

PATENT NO. : 9,628,439 B2
APPLICATION NO. : 13/816532
DATED : April 18, 2017
INVENTOR(S) : Donald E. Eastlake, III It is certified that error appears in the above-identified patent and that said Letters Patent is hereby corrected as shown below:

In the Claims

In Claim 4, at Column 18, Line 27, after the ";", insert the word --and--.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*